(12) United States Patent
Bérubé

(10) Patent No.: US 6,341,578 B1
(45) Date of Patent: Jan. 29, 2002

(54) DEVICE FOR TRAINING PET ANIMALS AND FOR ALLOWING THEM TO USE A CONVENTIONAL TOILET BOWL

(76) Inventor: Denis Bérubé, 1954, Richardson St. #4, Montreal (CA), H3K 1G7

( * ) Notice: Subject to any disclaimer, the term of this patent is extended or adjusted under 35 U.S.C. 154(b) by 0 days.

(21) Appl. No.: 09/429,043

(22) Filed: Oct. 29, 1999

(30) Foreign Application Priority Data

Nov. 2, 1998 (GB) .............................................. 9823825

(51) Int. Cl.⁷ .............................................. A01K 1/01
(52) U.S. Cl. ............................................ 119/162
(58) Field of Search ................ 119/161, 162; 4/239; D30/161

(56) References Cited

U.S. PATENT DOCUMENTS

| | | | | |
|---|---|---|---|---|
| 3,371,356 A | * | 3/1968 | Benjamin | |
| 3,490,082 A | * | 1/1970 | Murcott | |
| 3,860,970 A | * | 1/1975 | Thompson | 4/420 |
| 3,949,429 A | * | 4/1976 | Hall | |
| D271,435 S | * | 11/1983 | Kullenback | D30/161 |
| D345,414 S | * | 3/1994 | Douglas | D23/296 |
| 5,412,815 A | * | 5/1995 | Ellis | 4/239 |
| 5,640,928 A | * | 6/1997 | Rymer | 119/162 |
| 6,052,838 A | * | 4/2000 | Thom et al. | 4/239 |
| 6,112,339 A | * | 9/2000 | Nichols et al. | 4/484 |
| 6,119,629 A | * | 9/2000 | Sicchio | 119/162 |

* cited by examiner

Primary Examiner—Yvonne R. Abbott
(74) Attorney, Agent, or Firm—Eric Fincham

(57) ABSTRACT

A pet training device for use with a toilet bowl such that the pet will eventually be capable of using the toilet bowl, the device having a platform member securable to an upper rim of the toilet bowl such that the platform member extends outwardly from the toilet bowl and the removable main section having an aperture extending therethrough and a litter receiving portion located adjacent the main section aperture. After training, the main section can be removed and the pet, normally a cat, will be able to use the platform member.

7 Claims, 6 Drawing Sheets

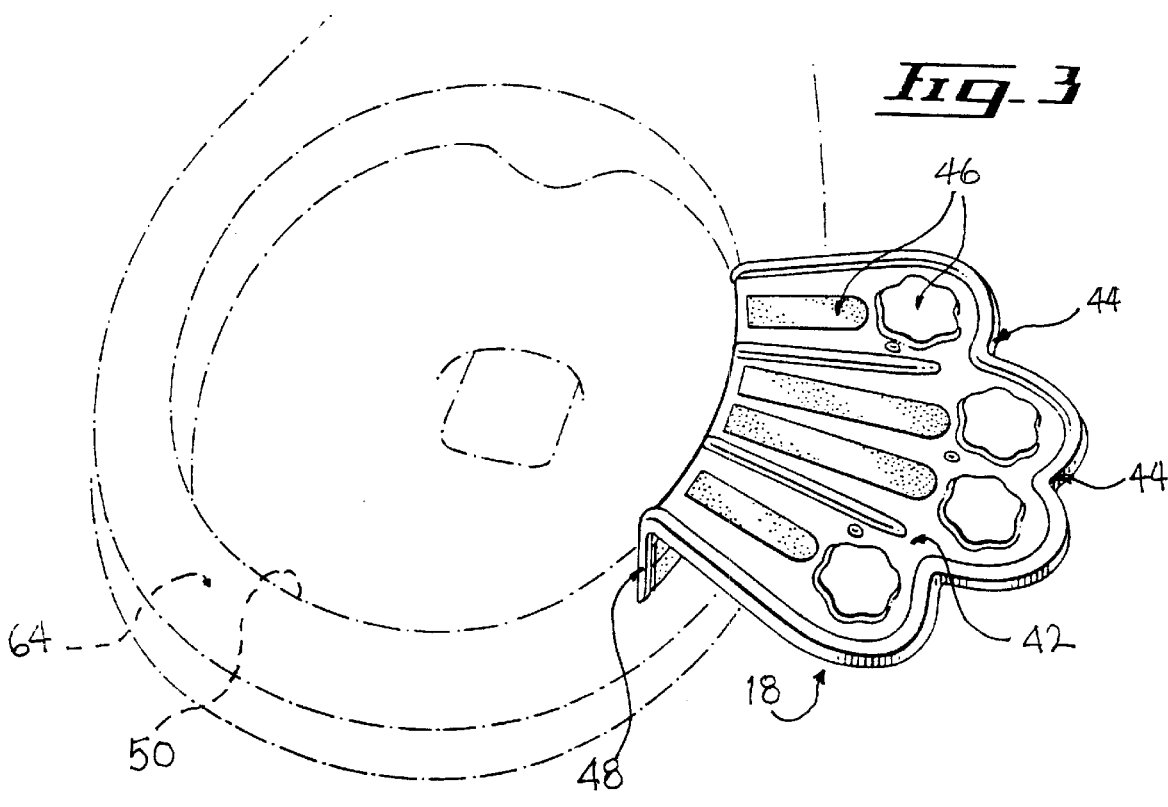
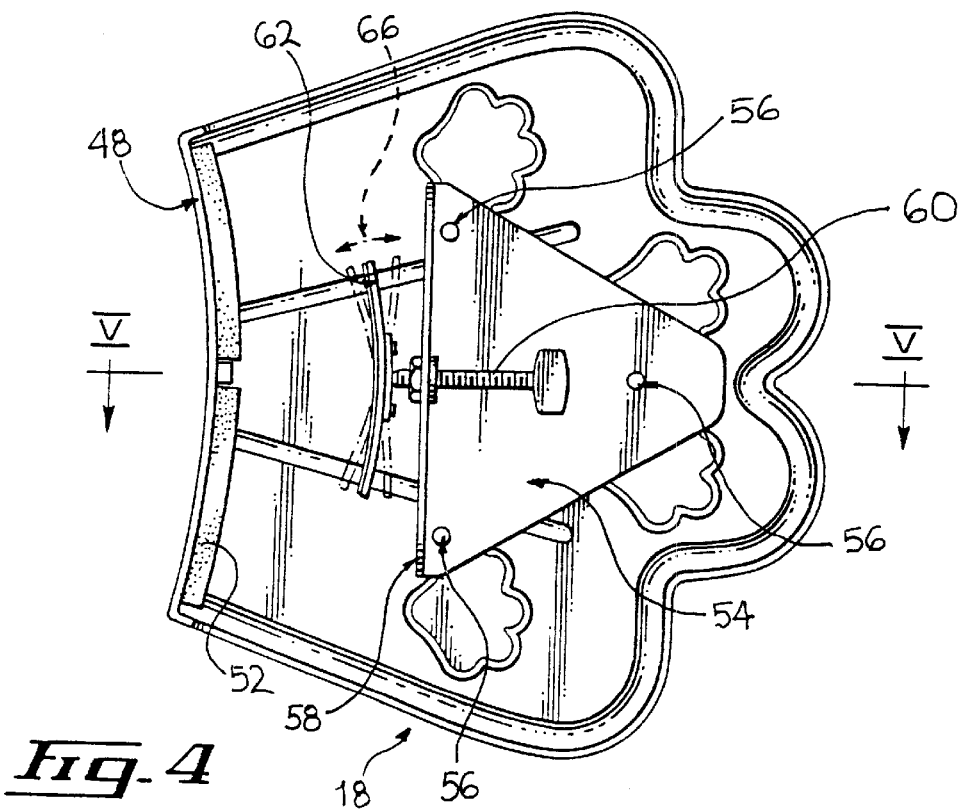

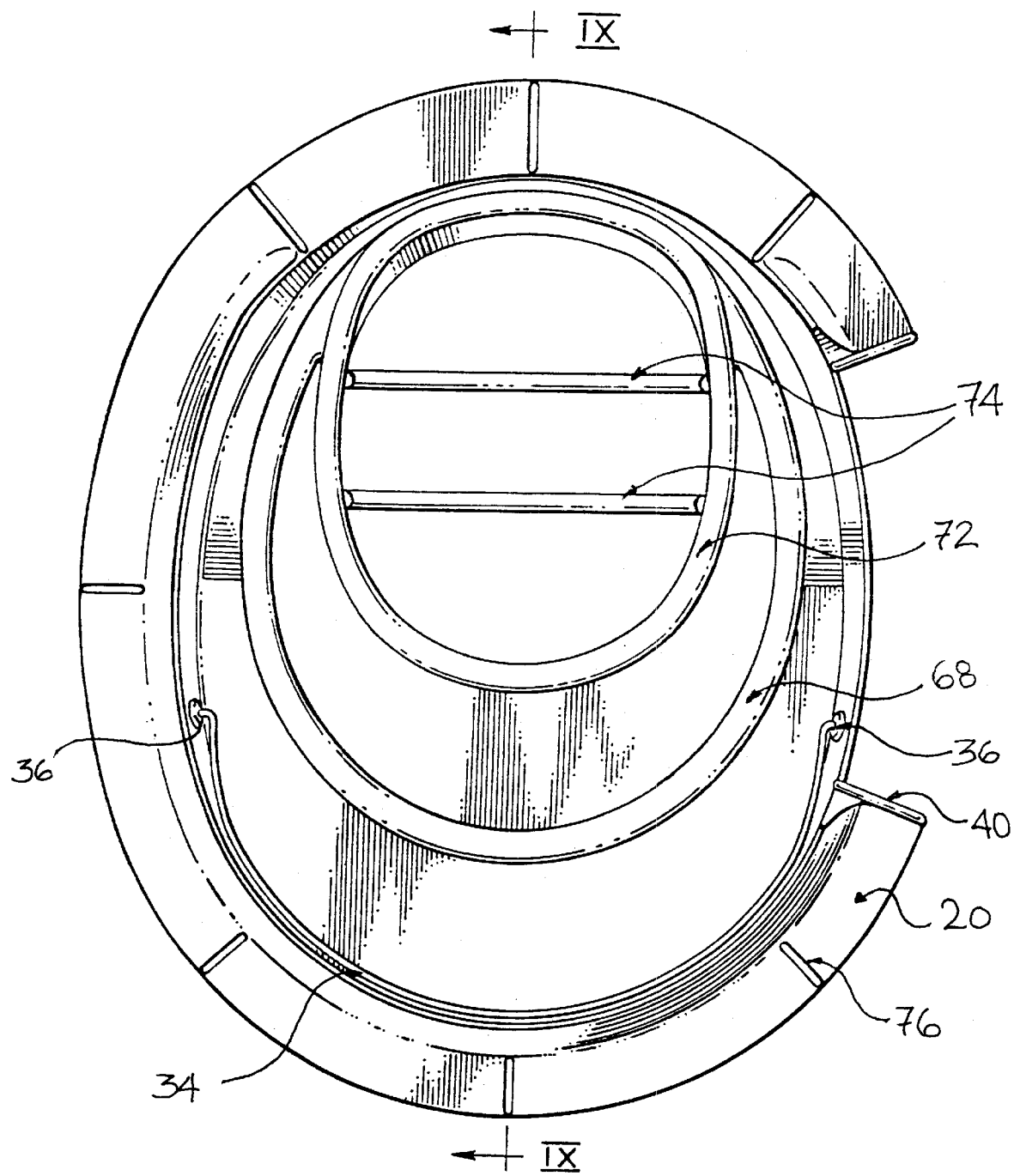

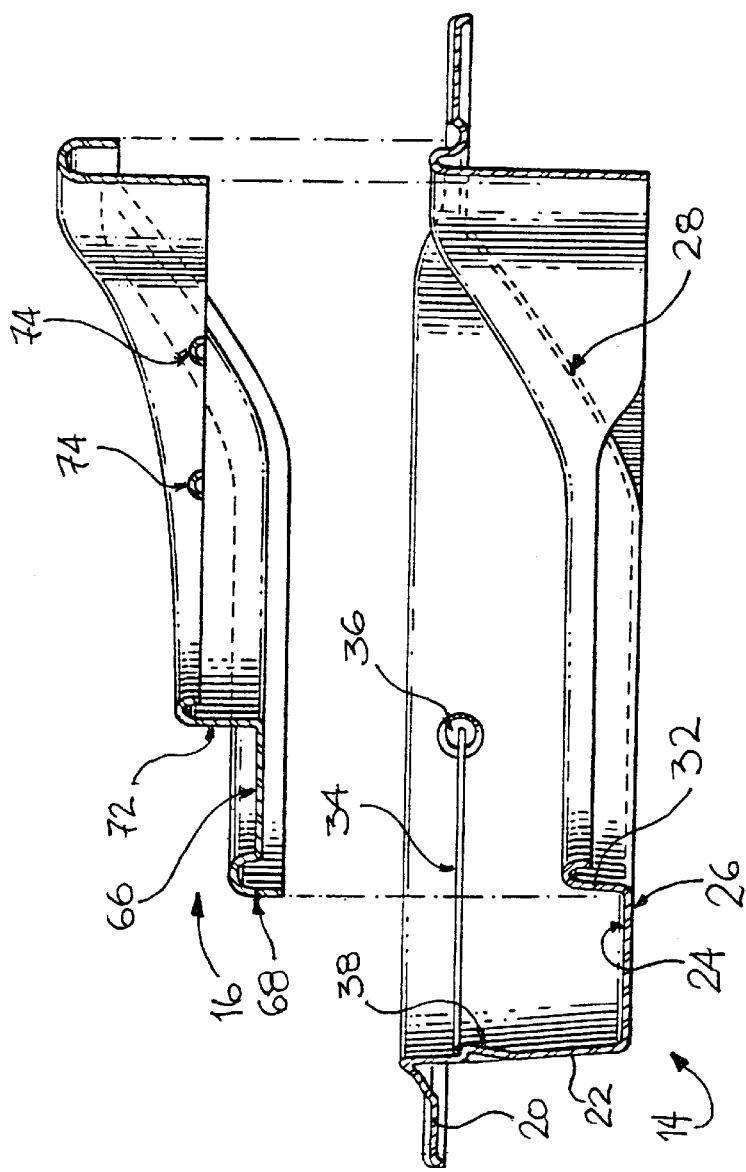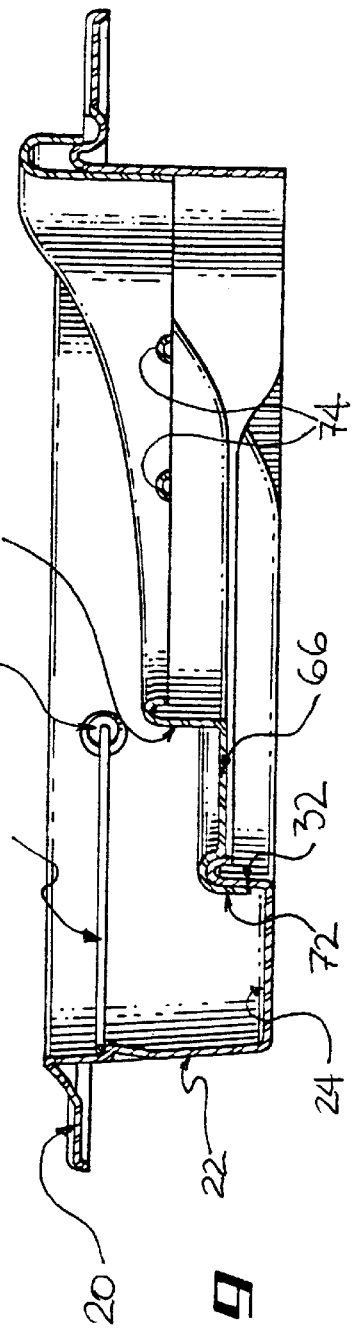

Fig. 10
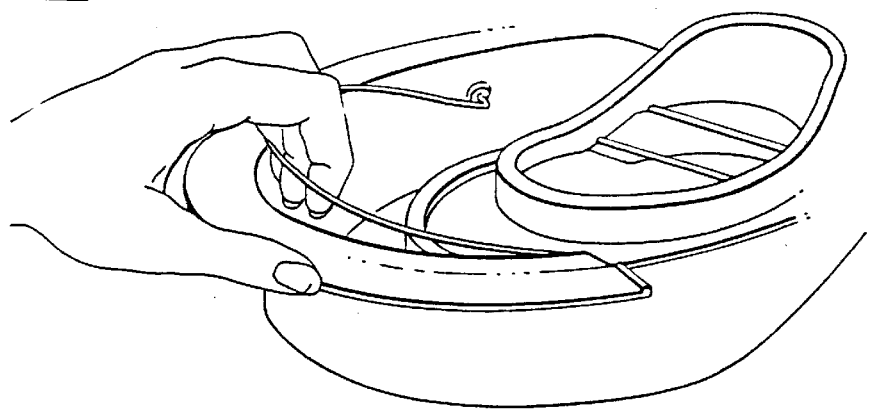
Fig. 11
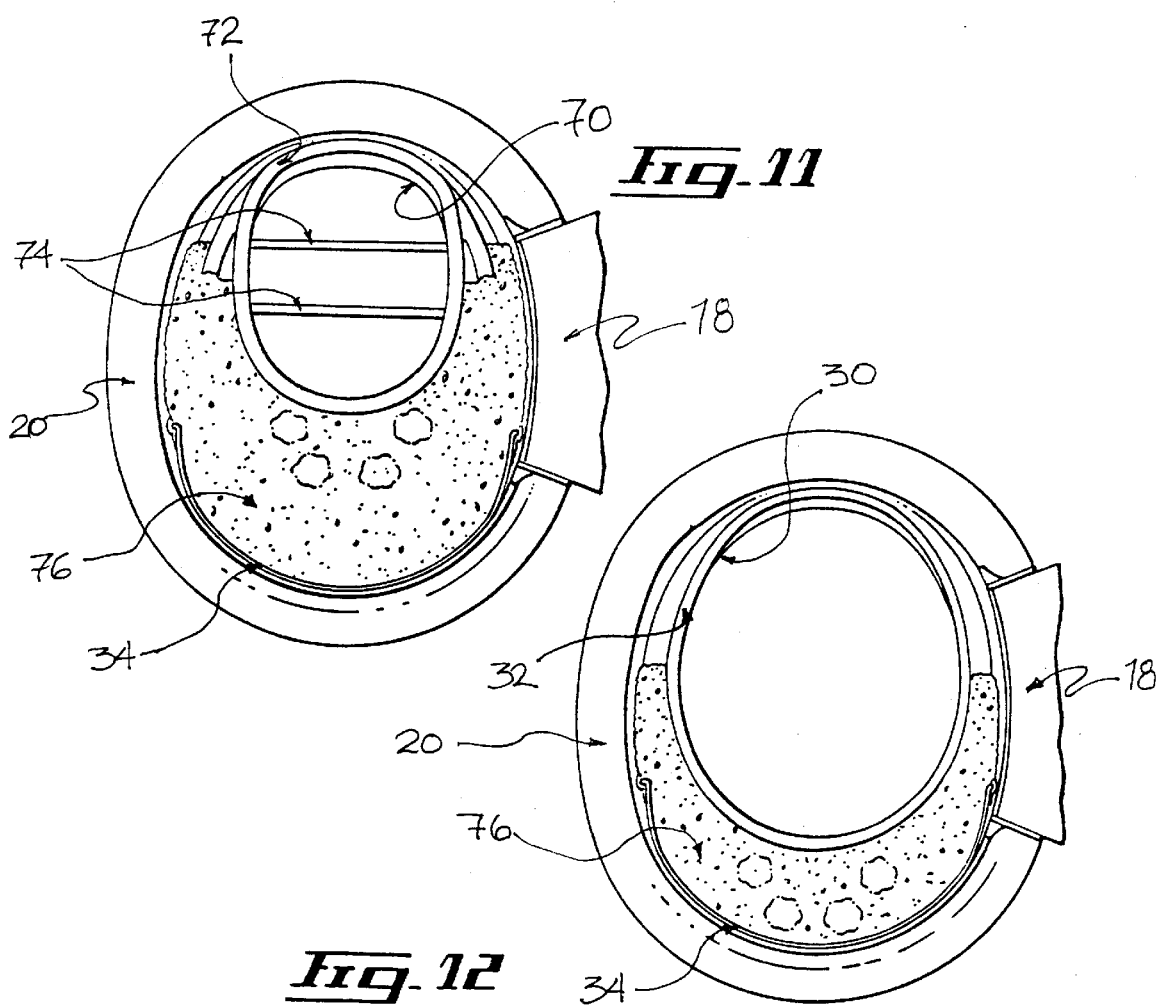
Fig. 12

DEVICE FOR TRAINING PET ANIMALS AND FOR ALLOWING THEM TO USE A CONVENTIONAL TOILET BOWL

BACKGROUND OF INVENTION AND BRIEF SUMMARY OF THE INVENTION

Cats and other animals in the pet category have a tendency to relieve themselves, outdoors, on lawns, flowerbeds, streets and sidewalks resulting in unsatisfactory conditions, along with annoying and inconveniencing many people. Housing in urban areas has been changing with little if any attached lawn space. Cats are often provided with indoor facilities such as a pan containing absorbent material that is cat litter boxes, which are unsatisfactory in some respects such as expense, odor and the required frequent clean up.

Accordingly, it would be desirable to train household pets to use the conventional toilet bowl. However, previous attempts at training conventional pets to use conventional toilet bowls have proven to be unsuccessful. Accordingly, there exists a need for structure that would gradually teach a conventional household pet to use a conventional toilet bowl.

It is an object of the present invention to provide a training technique and an associated training structure for training a conventional household pet to use a conventional toilet bowl.

It is another object of the present invention to provide a training device in accordance with the previous object which would gradually train the household pet to use the toilet bowl without risking the pet falling into the toilet bowl or using the latter as a source of drinking water.

It is a further object of the present invention to provide a training device in accordance with the previous objects which would conform to conventional forms of manufacturing, be of simple construction and easy to use so as to provide a training device that will be economically feasible, long lasting and relatively trouble free in operation.

BRIEF DESCRIPTION OF THE DRAWINGS

FIG. 3 is a perspective view illustrating a platform component mounted on a conventional toilet bowl, the toilet bowl being in phantom lines;

FIG. 4 a bottom view illustrating part of the platform of FIG. 3;

FIG. 7 is an elevational view illustrating the main and auxiliary sections;

FIG. 8 is an exploded side sectional view of the main and auxiliary sections;

FIG. 9 is a side sectional view of the main and auxiliary sections;

FIG. 10 is a partial perspective view, with sections taken out, illustrating the hand of an intended user grasping a handle part of the pet training device;

FIG. 11 is a top view illustrating the pet training device with litter disposed within its auxiliary tray; and FIG. 12 a top view with litter disposed within its main tray and having its auxiliary tray removed.

DETAILED DESCRIPTION OF THE INVENTION

Figure 1:
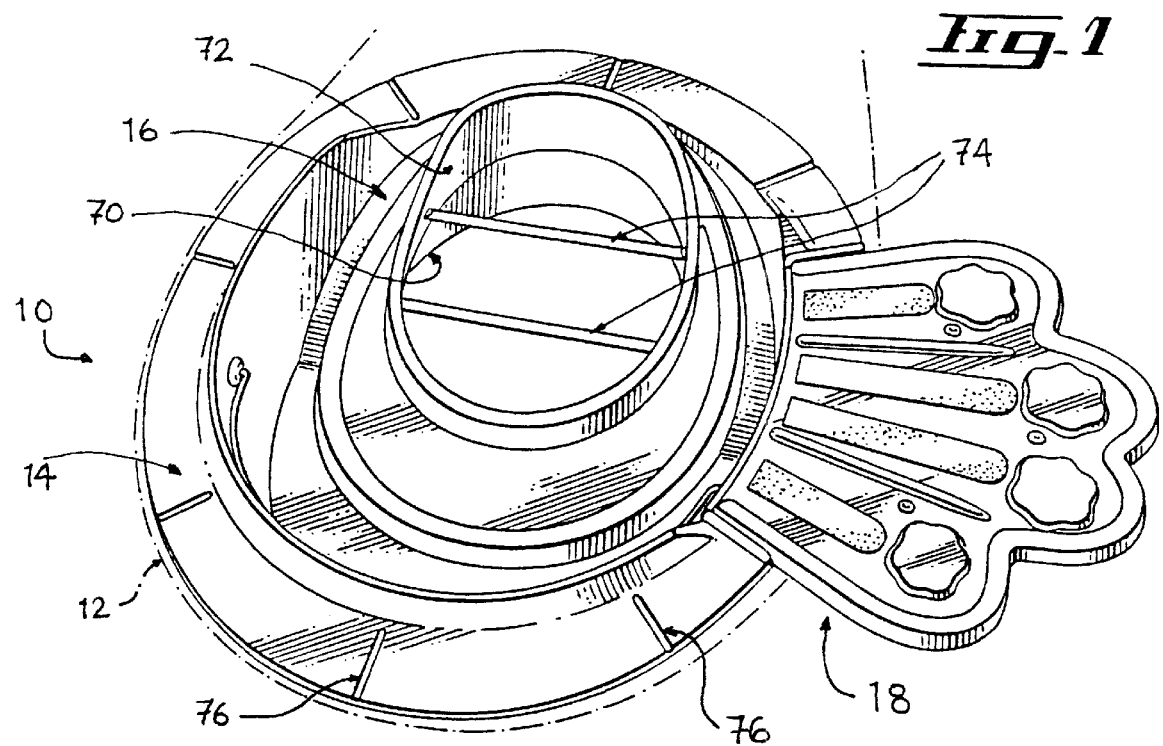
FIG. 1 is a perspective view illustrating a pet training device in accordance with an embodiment of the present invention with both of its removable sections being assembled.

Referring to FIG. 1, there is shown a pet training device 10 in accordance with an embodiment of the present invention mounted on a conventional toilet bowl 12 (the toilet bowl being shown in phantom lines). The training device 10 includes a main section 14, an auxiliary section 16 releasably mounted on the main section 14 and a platform 18.

Referring now more specifically to FIG. 8, there is shown, in cross section, the main section 14. The main section 14 includes a main section peripheral flange 20 that is configured and sized so as to abuttingly rest on the peripheral flange of the conventional toilet bowl 12 so as to support the main section 14 in an overlying relationship with the liquid contained within the conventional toilet bowl 12. The main section 14 also includes a peripheral wall 22 that extends integrally and substantially perpendicularly from the main section flange 20. The main section side wall 22, in turn, extends integrally and substantially perpendicularly into a main section bottom wall 24.

Figure 2:
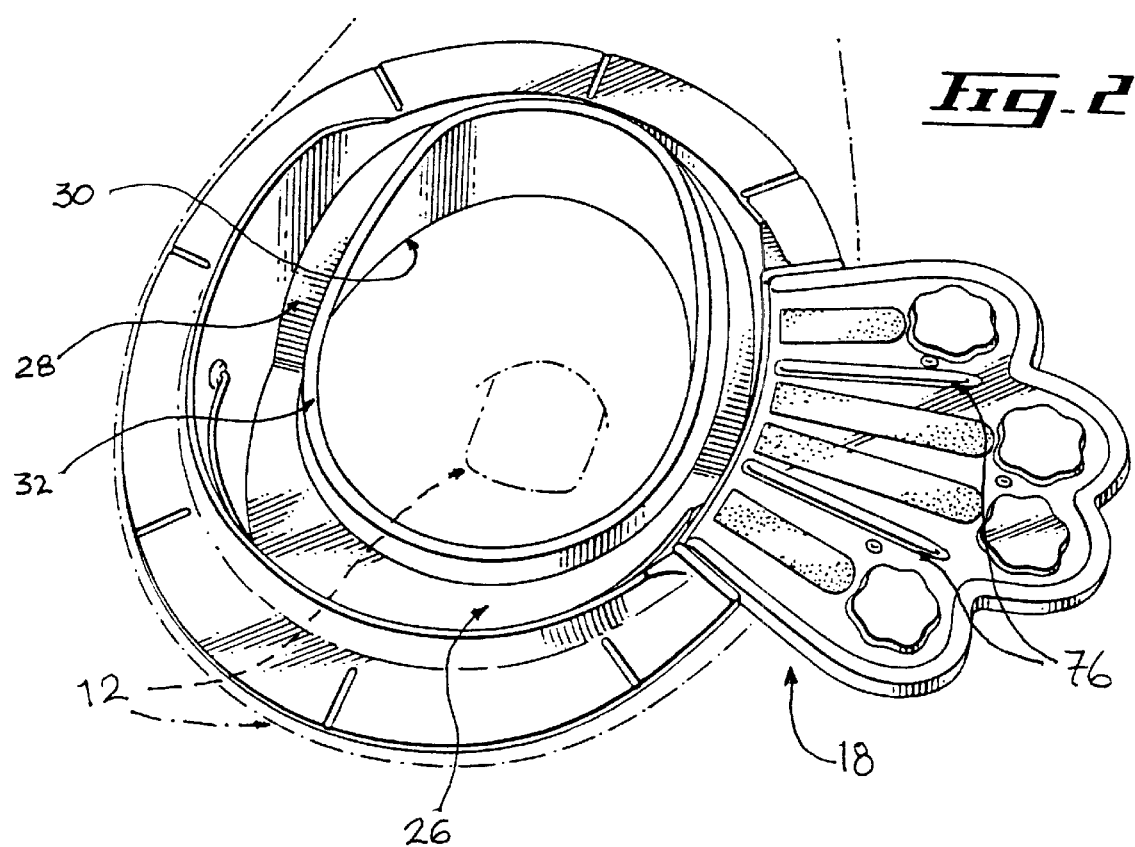
FIG. 2 is a perspective view illustrating the pet training device of FIG. 1 with its auxiliary section removed.

As illustrated more specifically in FIG. 2, the main section bottom wall 24 defines a bottom wall front section 26 extending in a generally parallel relationship with the main section flange 20 and a bottom wall rear section 28 slanting upwardly towards the rear section of the main section peripheral flange 20 in an angled relationship relative to the latter.

The main section bottom wall 24 has a main aperture 30 extending therethrough. The main aperture 30 is provided with a main rim 32 about its peripheral edge. The main rim 32 has a generally upwardly slanted configuration in a direction leading rearwardly. A handle 34 is pivotly mounted to the peripheral wall 22 by a pivotal connection 36. The peripheral wall 22 also defines an abutment recess 38 that is used for abuttingly supporting the handle 34 and preventing the latter from pivoting downwardly towards the bottom wall 24.

As illustrated more specifically in FIG. 7, the peripheral flange 20 is provided with an indentation 40 along one of its lateral sections. The indentation 40 is configured and sized so as to fittingly receive a section of the platform 18.

The platform 18 is illustrated in greater details in FIGS. 3 and 4. The platform 18 defines a supporting wall 42 preferably having an ornamental peripheral edge provided with ornamental recesses 44. The upper surface of the supporting wall 42 is further provided with ornamental protrusions 46 that are also adapted to act as antiskid means where as 46 "a" represent the ideal position of the four pet's paws. The supporting wall 42 has a perpendicularly oriented flange 48 depending integrally therefrom.

The flange 48 is configured and sized so as to substantially follow the internal contour of the peripheral edge 50 of the conventional toilet bowl 12. The inner surface of the flange 48 is provided with cushioning pads 52 preferably made out of a suitable elastomeric resin. Any conventional means of attachment such has a fixing plate 54 or other types of clamping means like two screws with padded tips could be used to clamp the flange 48 on the peripheral edge 50 of a conventional toilet bowl 12. A fixing plate 54 is mounted to the undersurface of the wall 42 using conventional fastening means such as rivets 56. The plate 54 is provided with a flange 58 extending perpendicularly therefrom. The flange 58 is provided with an aperture extending therethrough for allowing through passage of a threaded stem 60.

Figure 5:
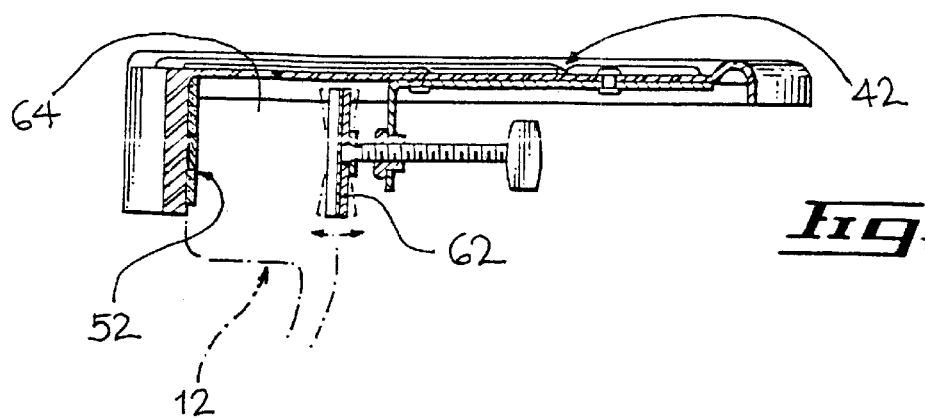
FIG. 5 is a cross sectional view taken along the lines V—V of FIG. 4.
Figure 6:
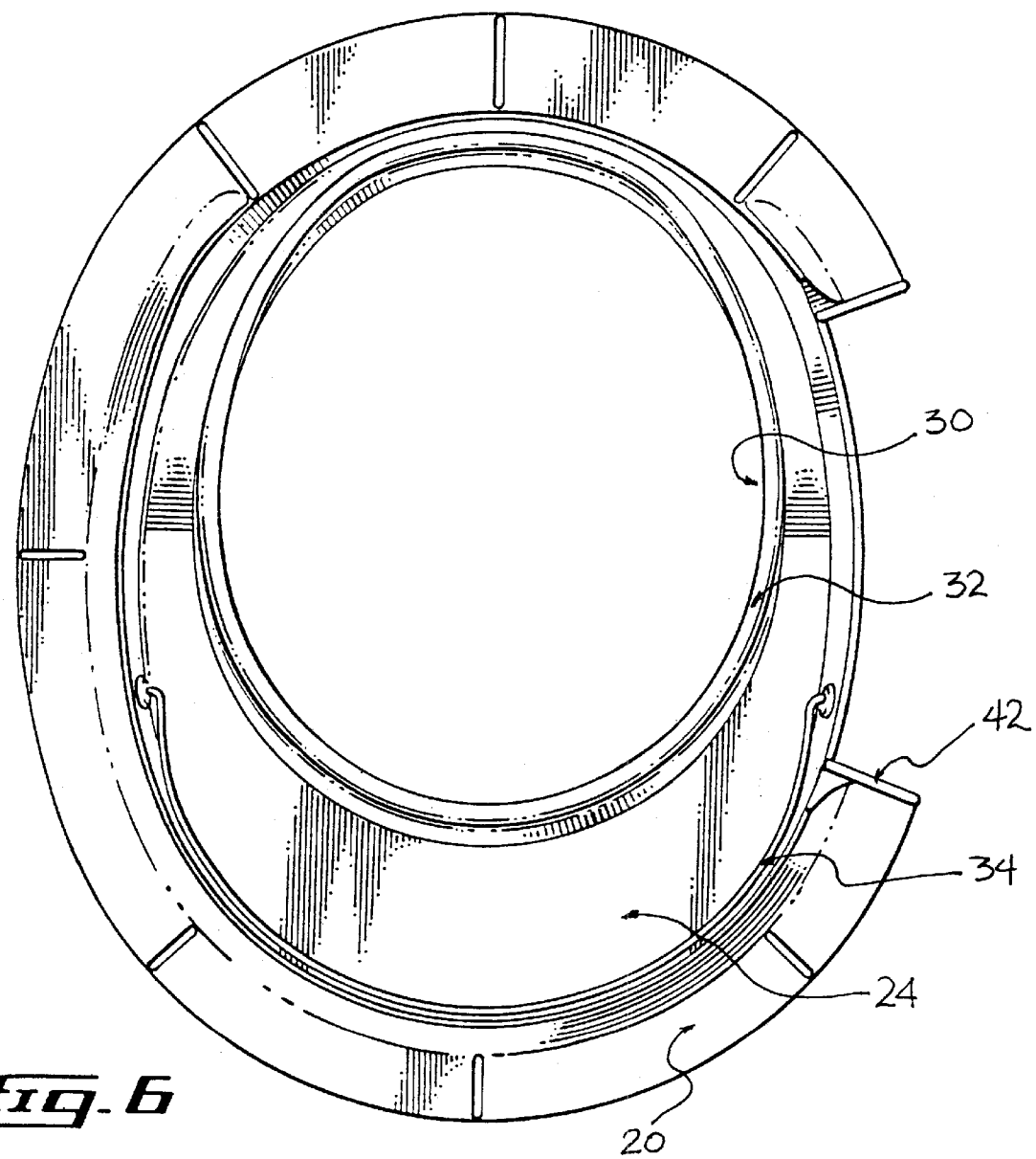
FIG. 6 is a top plan view illustrating a main section component.

The threaded stem 60 has an abutment plate 62 mounted at a distal end thereof for frictionally clamping the peripheral flange 64 of the conventional toilet bowl 12 against the friction pads 52 mounted on the abutment flange 48. As illustrated by arrow 66, the abutment plate 62 is mounted to the threaded stem 60 so as to allow angular adjustment depending on the specific configuration of the flange 64 of the conventional toilet bowl 12. FIG. 5, illustrates in greater detail the relationship between the abutment plates 62, the abutment pads 52 and the peripheral flange 64 of the conventional toilet bowl 13 when the supporting wall 42 is mounted to the latter.

Referring now back to FIG. 8, there is also shown the auxiliary section 16. The auxiliary section 16 includes an auxiliary section bottom wall 66 having a peripheral lip 68 extending integrally and substantially therefrom.

The auxiliary lip 68 is configures and sized so as to be fittingly insertable over the peripheral rim 32 of the main aperture 30. The auxiliary bottom wall 66 has an auxiliary aperture 70 extending therethrough. Similarly, an auxiliary rim 72 extends substantially perpendicularly from the peripheral edge of the auxiliary aperture 70. The auxiliary rim 72 also tapers frontwardly. At least one and preferably two restraining bars 74 extend transversely across the auxiliary aperture 70 between opposite sides of the auxiliary rim 72. Initially, the restraining bars 74 are joined by removable sections.

In use, the device 10 is first installed with its auxiliary section 16 mounted on the main section 14. As illustrated in FIG. 11, the bottom walls 24 and 66 of the main and auxiliary components 14 and 16 respectively are covered with a conventional litter material 76. The domestic pet is invited to use the platform 18 for accessing the litter material 76 in a conventional manner. Since the pet is initially unfamiliar with the environment, the restraining bars 74 prevent the pet from falling into the auxiliary aperture 70 and from attempting to drink water from the toilet bowl 12 through the auxiliary aperture 70. Once the pet has become accustomed to using the device, as shown in FIG. 11, the auxiliary section 16 may be removed so that only the bottom wall 24 of the main section 14 is fitted with litter material 76.

Ultimately, the pet becomes accustomed to the environment of the toilet bowl and may use platform 18 to use the conventional toilet bowl in a conventional manner. As illustrated in FIG. 10, the handle 34 may be used to facilitate handling and maintenance of the training device 10. The training device 10 may be manufactured using a conventional injection or thermoforming manufacturing process.

Various reinforcement ribs 76 may be provided for increasing structural rigidity.

I claim:

1. A pet training device for use with a toilet bowl having an upper rim, said pet training device comprising:
    a platform member, means for securing said platform member to said upper rim of said toilet bowl such that said platform member extends outwardly from said toilet bowl;
    a main section having a main section aperture extending therethrough, said main section being sized and configured to sit on said toilet bowl rim, said main section having a litter receiving portion located adjacent said main section aperture; and
    an auxiliary section, said auxiliary section being sized and arranged to cover said main section aperture, said auxiliary section having removable sections formed therein such that when said removable sections are removed to leave an auxiliary section aperture, said auxiliary section aperture is in communication with said main section aperture.

2. The pet training device of claim 1 further including a handle connected to said main section.

3. The pet training device of claim 1 wherein said auxiliary section includes restraining bars extending across said removable sections.

4. The pet training device of claim 1 wherein said platform member has anti-skid means on an upper surface thereof.

5. The pet training device of claim 1 wherein said means for securing said platform member to said upper rim of said toilet bowl comprises clamping means.

6. The pet training device of claim 5 wherein said clamping means include cushioning pads thereon.

7. In combination, a toilet and a pet training device, said toilet having a toilet bowl with an upper rim, said pet training device comprising:
    a platform removably connected to said upper rim of said toilet bowl, said platform extending outwardly from said upper rim with respect to said toilet bowl;
    a main section seated on said upper rim, said main section having a litter receiving portion located adjacent said main section aperture; and
    an auxiliary section, said auxiliary section means covering said main aperture, said auxiliary section having apertures formed therein communicating with said main section aperture.

\* \* \* \* \*